United States Patent [19]

Peterson

[11] 3,747,086

[45] July 17, 1973

[54] DEACTIVATABLE FERROMAGNETIC MARKER FOR DETECTION OF OBJECTS HAVING MARKER SECURED THERETO AND METHOD AND SYSTEM OF USING SAME

[75] Inventor: Glen Peterson, Tulsa, Okla.

[73] Assignee: Shoplifter International, Inc., Carrollton, Tex.

[22] Filed: Nov. 24, 1971

[21] Appl. No.: 201,687

Related U.S. Application Data

[60] Division of Ser. No. 747,050, March 22, 1968, Pat. No. 3,631,442, which is a continuation-in-part of Ser. No. 680,666, Nov. 6, 1967, abandoned.

[52] U.S. Cl. .................... 340/280, 179/82, 325/8, 340/258 R, 343/6.5 SS, 343/6.8, 343/787

[51] Int. Cl. .................... G08b 13/26

[58] Field of Search .................... 340/258 R, 258 C, 340/280, 224; 325/8, 105; 343/6.5 SS, 6.8, 787, 788; 179/82; 235/61.12 M

[56] References Cited

UNITED STATES PATENTS

| | | | |
|---|---|---|---|
| 2,774,060 | 12/1956 | Thompson | 340/258 R |
| 3,098,971 | 7/1963 | Richardson | 325/8 X |
| 3,218,638 | 11/1965 | Honig | 340/224 X |
| 3,292,080 | 12/1966 | Trikilis | 340/258 R X |
| 3,384,892 | 5/1968 | Postman | 340/258 R X |
| 3,423,674 | 1/1969 | Goldsmith et al. | 340/258 C X |
| 3,518,546 | 6/1970 | Augenblick et al. | 325/8 |

*Primary Examiner*—David L. Trafton
*Attorney*—D. Carl Richards, Jerry W. Mills et al.

[57] ABSTRACT

A deactivatable ferromagnetic marker useful in tagging objects to allow selective detection of tagged objects depending upon the activation state of the marker. The marker comprises a plurality of ferromagnetic elements including a first element capable of generating a signal containing harmonics of an exciting oscillatory interrogating field and a second element having a coercive force greater than the first element and capable of retaining a state of magnetization when exposed to the interrogation field, such that when so magnetized a magnetic bias is imposed on the first element to prevent the generation of the harmonic signal. The system includes the marker attached to selected objects, an interrogation field, detection means, and deactivation means wherein the second element becomes magnetized.

18 Claims, 10 Drawing Figures

DEACTIVATABLE FERROMAGNETIC MARKER FOR DETECTION OF OBJECTS HAVING MARKER SECURED THERETO AND METHOD AND SYSTEM OF USING SAME

CROSS REFERENCE TO RELATED APPLICATIONS

This application is a divisional application of U.S. Pat. application Ser. No. 747,050 filed Mar. 22, 1968, now U.S. Pat. No. 3,631,442, which was filed as a continuation-in-part of now abandoned patent application Ser. No. 680,666 filed Nov. 6, 1967.

FIELD OF THE INVENTION

The invention relates to a marker and a method of using the marker in a system for detection of the marker to prevent unauthorized removal of objects having the markers attached thereto.

DESCRIPTION OF THE PRIOR ART

There are in existence several systems for detecting or preventing the theft of articles of value. One of these corresponding with U.S. Pat. No. 3,292,080, granted to E. M. Trikilis, Dec. 13, 1966, makes use of a magnetometer and utilizes a magnetized object which identifies the article unless checkout procedure has removed the magnetism from the object. The magnetized object is attached to or becomes a part of the merchandise or article of value, and by energizing the magnetometer system as it passes through the doorway, is detected. If the magnetized object has been demagnetized it causes no magnetic signal as it passes through the doorway and is not detected. Demagnetizing is done in the process of checking out the merchandise. Thus by the checkout procedure an individual has free passage with the merchandise that has been paid for or recorded by the clerk. Any additional merchandise not paid for and however concealed radiates a magnetic influence, and energizes the magnetometer at the doorway, creating an awareness of security department personnel that something is being stolen.

Another system involves radioactive material which emits nuclear radiation. When the label containing the magnetic material is removed from the merchandise, the radiation is no longer emitted, and therefore radiation detectors situated in the doorway are not energized. On the other hand, if the radiation emitters remain on the merchandise, doorway sensors of nuclear radiation react, and security personnel are in a position to prevent the theft.

In another system currently being employed in a men's wear department in Macy's in New York City, the operator uses a radio frequency generating device embedded in a rubber pad. The radio frequency emitting device is fastened to the men's clothing, and if not removed, will energize radio frequency detecting antennas at the doorway. In the normal course of events, when the merchandise is sold, a special fastener is unlocked and the radio frequency emitter is removed from the clothing at the time it is sold, permitting the buyer to pass through the doorway without attracting the attention of the store detective.

French Pat. No. 763,681, issued to Pierre Arthur Picard, discloses a remote detection system which employs dynamic magnetic phenomena to detect the presence of an object, e.g. a library book being carried through a doorway. The system of Picard is based upon the discovery that a piece of metal subjected to a sinusoidally varied magnetic field produces in a pair of balanced pickup coils in the vicinity of the applied field an induced voltage characteristic of the metal. The Picard patent discloses that high permeability metals produces an induced voltage including high order harmonics of the sinusoidal field.

All of the foregoing systems have severe difficulties of one kind or another. The Trikilis system requires a rather large piece of ferromagnetic material for the marking of the merchandise. If too small a piece of ferromagnetic material is used, ambient variations in the magnetic field are greater than the changes caused by the Trikilis merchandise marker. In the case of the radioactive dot, there is a severe health problem involving danger to people from the nuclear radiation, and involving danger to those who remove the markers and store them. The system in use in Macy's Store unfortunately is limited by the extreme costliness of the radio frequency transmitter, and the limited period of time during which its emission can be maintained by the little batteries with which it is provided. True, larger radio frequency emitting pads could be made, but these tear or injure the clothing, and are impractically bulky. The Picard system does not provide a means of deactivating the marker, nor does it provide sufficient sensitivity to uniquely identify particular marker construction as opposed to other ferromagnetic materials.

I have discovered a practical solution to the problems presented but not solved by the workers in the prior art as described above. As a matter of convenience, I choose to employ electromagnetic radiation. However, because of the inconvenience of supplying energy in a contraband marking, the energy to be radiated from the contraband marked device is delivered, instead, from electrical coils located in the structural members of my sensing doorway.

I have found it extremely difficult to re-radiate or reflect energy in a distinctive manner from any merchandise marker for the reason that all solid bodies and all electrically conductive masses (including the human body which is largely composed of salt water) also reflect or disperse electromagnetic radiation and therefore must be considered in the recognition of any merchandise marking. A human being reflects more electromagnetic energy than any practical size of merchandise marker.

A copending patent application by E. R. Fearon, entitled "Open-Strip Ferromagnetic Marker and Method and System for Using Same", also a division of U.S. Ser. No. 747,050, describes an improved marker and system. This marker, when secured to an object, enables the detection of the presence of the object when the object is in an interrogation zone such as a doorway when the zone has a magnetic field periodically varying at a predetermined fundamental frequency. The improved marker utilizes an elongated ferromagnetic element of low coercivity capable of generating a detectable signal containing harmonics of the fundamental frequency when placed in the zone. In a preferred mode, in which the ratio of the length to the square root of cross-sectional diameter is in excess of about 200, harmonics of the fundamental frequency in excess of $10^{+3}$ order are generated.

SUMMARY OF THE INVENTION

My invention provides a further improved marker over that disclosed in the above-identified copending application by E. F. Fearon. This marker further comprises at least a second ferromagnetic element disposed close to and generally aligned parallel with the first element and having a coercivity in excess of 5 oersteds and greater than the first element. The second element, when magnetized, alters the harmonic content of the signal produced by the first element when in the interrogation zone. The coercive force of the second element is desirably greater than the field produced in the interrogation zone such that the field is unable to reverse the magnetic state of the second element when such objects pass through the zone. In this way, when the second element is magnetized, a magnetic bias is imposed on the first element sufficient to alter the switching response of the first element.

The present invention is further directed at a system for detecting the presence, identity, or status of objects in an interrogation zone such as a doorway, having a magnetic field periodically varying at a predetermined fundamental frequency. Such a system includes the markers of the present invention in conjunction with the interrogation zone, the magnetic field within the zone having a peak intensity greater than the coercivity of the first ferromagnetic element but less than the coercivity of the second element. The system additionally includes a detector to receive the signal produced by the first element and a circuit to analyze the signal so produced in order to indicate the presence, identity, or status of objects in accordance with the harmonic content.

A further embodiment of my system includes a means for altering the magnetic characteristics of the merchandise marker during a checkout procedure so that the alteration is recognizable as an indication that the merchandise has been properly sold.

DESCRIPTION OF THE PREFERRED EMBODIMENT

Figure 1:
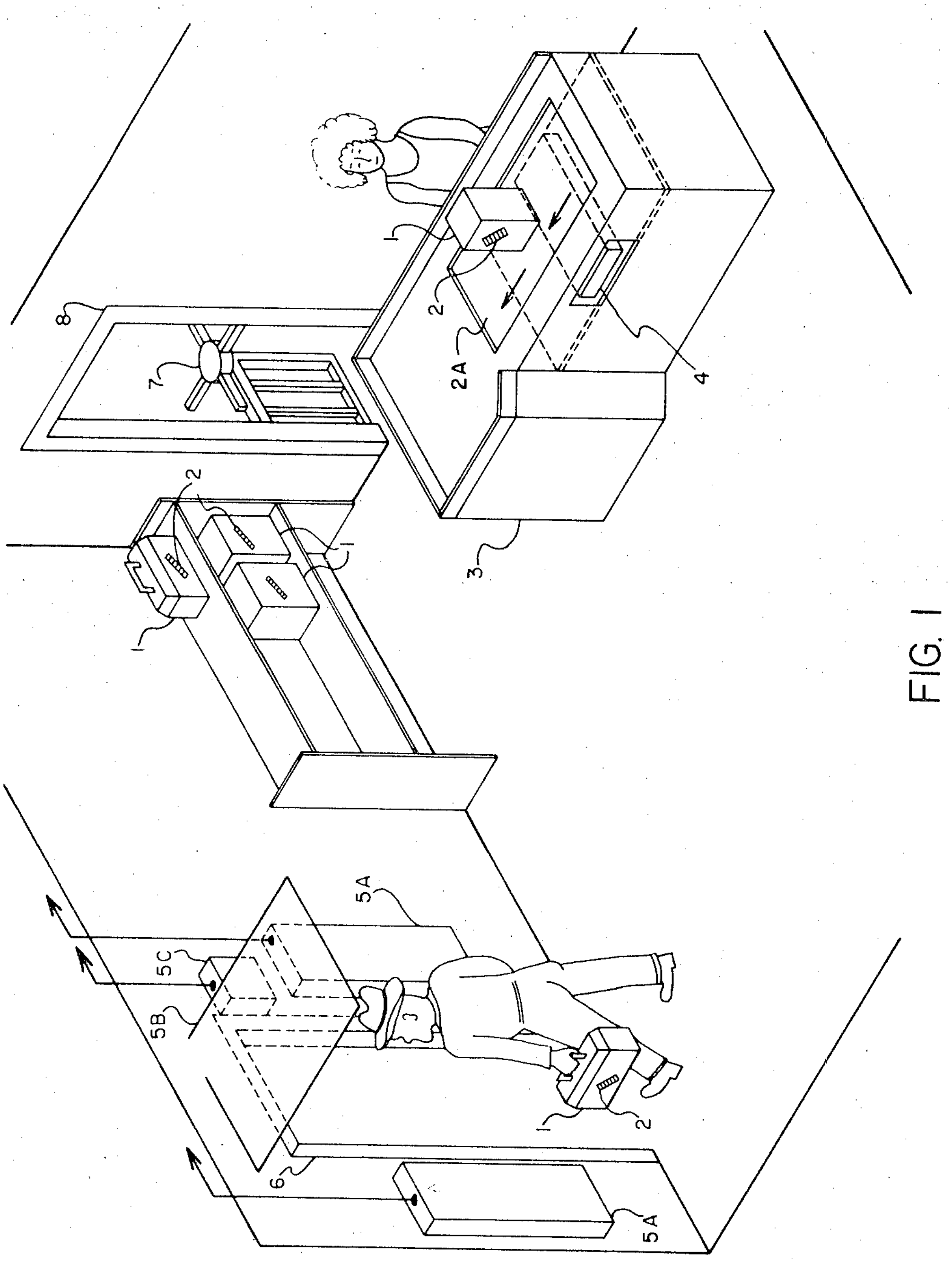
FIG. 1 shows a somewhat diagrammatic view of a typical installation of the present system.

I now turn to FIG. 1 which is a general view of the manner in which the present system operates in a store to prevent theft of merchandise. Merchandise 1 is provided with contraband marker elements 2. The checkout stand area 3 contains a deactivating device 4 which is capable of changing the electromagnetic properties of the contraband marker elements 2. An energizing and detecting system 5A situated in the 5B and 5C vicinity of the outgoing doorway 6 detects the contraband marker elements 2, and indentifies those which have not been subjected to change at the checkout stand area 3 by the deactivating device 4. In the use of my system, one way traffic, enforced by perhaps a turnstile 7, takes care of persons entering the store, prohibiting the carrying of merchandise from the store to areas outside the store except through my outgoing doorway 6. The turnstile 7 is provided at the entry portal 8.

Attention is now directed to the energizing and detecting system 5 (FIG. 1) situated in the outgoing doorway 6 (FIG. 1). Because there are three perpendicular coordinates available in space of three dimensions, two energizing systems and detecting devices can be arranged to work in a non-interacting manner. In fact, it is a characteristic of one embodiment of the invention that within the limits of accuracy of adjustment of the position and orientation of the electromagnetic radiating and receiving components, the two radiating components radiate independently, neither one being capable of transmitting energy into the other one, and further, the detecting or receiving pickup does not receive energy directly from either of the radiating devices. These arrangements of course are valid only when the space in the doorway is empty, there being no contraband marker elements 2 (FIG. 1) in it. This type of arrangement which has been generally recited above is depicted in more detail in FIG. 2.

Figure 2:
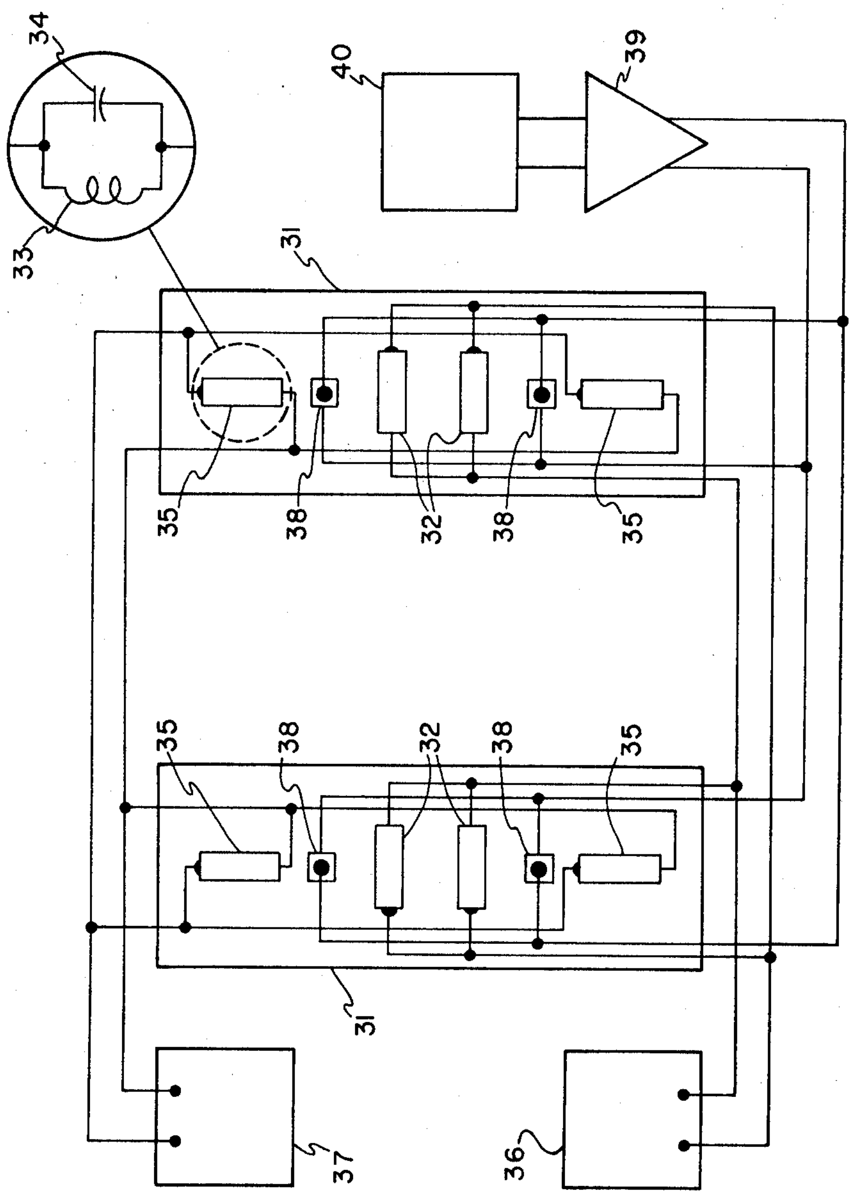
FIG. 2 is a block electrical diagram of one embodiment of the energizing and detecting system.

In FIG. 2 I have pictured two pedestals 31, each containing near its center a pair of sending coils 32. All the sending coils 32 are connected in parallel (or they could have been connected in series). For illustration only, I will suppose that the frequency by which these sending coils 32 are energized is 21 kilohertz. Each such sending coil 32 is separately tuned to exhibit the highest possible impedance at 21 kilohertz. For illustration only, the coils may be composed of 99 turns of No. 20 copper wire wound on a one inch diameter coil form in a single layer to produce 99 turns in a total length of 3 ½ inches. Such a coil may be resonated to 21 kilohertz by the use of an electrical capacity of not less than 1 microfarad and not more than 1.1 microfarad. The combination of one of these coils 33 with its resonating capacitor 34 (as shown in the inset), when energized at the resonant frequency, represents an entirely resistive impedance and in the illustrative case exhibits a resistance between 100 and 150 ohms. A parallel combination of four such resistive loads has a combined effect adapted to efficiently load the voice coil outputs of some available audio amplifiers.

Similarly, there are situated at the bottom and at the top of each of the pedestals 31, coils 35 intended for transmitting another chosen frequency such as (for illustration only) 24.5 kilohertz. The four coils 35 which are intended for 24.5 kilohertz radiation may be constructed similarly and resonated similarly, but, of course, resonate with a correspondingly smaller electrical capacity for each coil. The combination of the first group of four coils 32 is connected to a source of electrical energy 36 at 21 kilohertz. The combination of the second group of four coils 35 is connected to a separate, entirely independent, source of electrical energy 37 at 24.5 kilohertz. Because of the arrangement which I have chosen for the first group of coils 32 and for the second group of coils 35, there is no appreciable mutual inductance acting to deliver 21 kilohertz energy into the 24.5 kilohertz,or vice versa.

At four other locations are presented four more coils 38 with their axes perpendicular to the plane of the paper. Because all the contributions of the first group of four coils 32 and the second group of four coils 35 lie in the plane of the paper, the four coils 38 with their axes perpendicular to the plane of the paper do not receive energy neither at 24.5 kilohertz, nor at 21 kilohertz. The four coils 38 with their axes perpendicular to the paper are resonated at 3.5 kilohertz by choosing an appropriate electrical capacitance. In order to achieve good sensitivity in these coils, and in order that they may be resonated efficiently at the frequency of 3.5 kilohertz, more copper is required in the winding, preferably four layers of No. 20 wire, each layer containing 99 turns more or less. The capacity required to resonate such a coil is in the general vicinity of two microfarads for 3.5 kilohertz.

I call attention to the fact that the cores of these windings have not been specified thus far. It is a preferred choice to wind them on non-magnetic, electrically non-conducting material, for the reason that ferromagnetic material (because of its nonlinear properties) imparts to my system undesirable interactions between the energy sources. Electrically conducting material, on the other hand, destroys the quality of the inductive performance of all the coils. As a matter of fact an air core coil of 99 turns, made in the manner that I have described, has a Q in the vicinity of 500 at 21 kilohertz when wound on a wooden core. The resonance cannot be found, nor the inductance measured well enough to determine the Q if it is wound on an electrical conductor as a core.

The combination of the four coils, as described, with their axes perpendicular to the paper (each coil resonated at 3.5 kilohertz by appropriate electrical capacitance) delivers its output to the ingoing end of a high gain tuned amplifier 39 adapted to selectively receive and amplify electrical signals at 3.5 kilohertz. The amplifier 39 delivers its output to an alarm mechanism 40, or to a carrier frequency module, which is discussed further on. To achieve a closer impedance match with respect to the commonly prevailing input resistance of the amplifiers that are the most convenient, I may choose to vary from the connections shown in FIG. 8, and connect the four receiving coils 38 (the ones with their axes perpendicular to the paper) in series. The resistive component of these coils (with their resonators connected) comes out for each such resonated system in the vicinity of 100 ohms, with the result that the series of four of them are a close match to the communications impedance figure of 500 ohms, a common choice for amplifiers, filters, etc.

Figure 3:
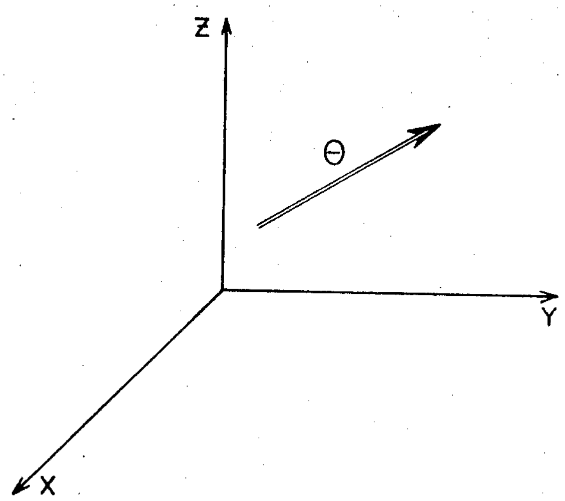
FIG. 3 is a diagram to assist in the explanation of the operation of the energizing and detecting system.

I turn now to FIG. 3 presented for the purpose of diagrammatically assisting in the explanation of the manner of functioning of the energizing and detecting system 5 (FIG. 1) which I have particularly detailed and described in connection with FIG. 2. In FIG. 3 the axis X may be taken to represent the action of the 21 kilohertz radiator, the perpendicular axis Y illustrates the action of the 24.5 kilohertz radiator, and the axis Z represents the receiving sensitivity or direction of the 3.5 kilohertz receiving coils 38 of FIG. 2. The vecotr $\theta$ is illustrated in a direction not parallel to nor perpendicular to any of the three axes. The vector $\theta$ represents the direction in which a contraband marker element 2 (FIG. 1) is capable of receiving and re-radiating energy. Because the vector $\theta$ has an appreciable component in all three axes, the contraband marker element 2 (FIG. 1) oriented in accord with this vector is able to receive energy concurrently at 21 kilohertz, and likewise at 24.5 kilohertz. For similar reasons, if the contraband marker element 2 (FIG. 1) re-radiates at 3.5 kilohertz (not being deactivated) then detection axis Z is so directed with respect to the vector $\theta$ that the said detection system is not insensitive to radiation emitted by the contraband marker element 2 (FIG. 1).

The user, considering the information presented in connection with FIG. 2, and the information just presented in connection with FIG. 3, will realize that the reception of a 3.5 kilohertz in my system is a distinctive and an exclusive evidence of the presence of contraband marker elements 2. (FIG. 1). One or more such elements must be in the domain of energy radiation and sensitivity provided by the arrangements shown in FIG. 2 to deliver a 3.5 kilohertz signal. Other entities than contraband marker elements are not entirely without effect, but they do not present the same effects.

To aid the understanding of another modification of my system which I have described, I turn again to FIG. 3. In FIG. 3 I have represented the directions of action of the energy source frequencies X and Y (21 and 24.5 kilohertz sources) and the direction of sensitivity of the system that detects the difference tone Z in the form of three perpendicular axes. To the worker skilled in the art, it is evident that if contraband vector $\theta$ is exactly perpendicular to either of the signal source axes X or Y, energy is eliminated which corresponds with the vector to which the vector $\theta$ is perpendicular. Furthermore, if the vector $\theta$ lies in the X – Y plane, it is perpendicular at all times to the axes Z which therefore prohibits the reception of any energy in the signal receiving system 38, (FIG. 2). It is, in fact, true that the vector $\theta$ must have appreciable and comparable components or direction cosines aligned with all three of the vectors X, Y, and Z. For those directions $\theta$ which do not fulfill these conditions, either the difference tone signals are not produced or they are not observed (if produced) by the contraband marker element 2 (FIG. 1). The fact that there are so many blind spots and so many requirements on the direction of contraband, causes the system, conceived as in the foregoing, to sometimes fail to recognize contraband markers passing through the outgoing doorway 6 (FIG. 1). It still remains a fact that nothing other than a contraband marker will ring the alarm. However, a way has been discovered to reduce the inconvenience resulting from the above noted limitations (which now and then permit a contraband marked piece of stolen merchandise to get through).

The user will note in FIG. 2 that in the foregoing the energy from the 21 kilohertz source has been excluded from the 24.5 kilohertz source by arranging for separate radiators, and arranging that these be non-interacting because of their perpendicularity arrangement. Another approach to excluding wrong pathways of signal energy is quite applicable in the frequency range which I have chosen, an approach not dependent on geometry. My modification permits advantages in the simplification of the doorway structure.

The system which is contemplated for the reduction of the number of blind spots in respect to the direction of the vector $\theta$ (FIG. 3) substitutes rigorously designed wave filters, containing passive elements only. These perform the function performed by the geometric isolation in the system of FIG. 2. Such wave filters can be designed for the range of frequency in the vicinity of 20 to 50 kilohertz without the use of ferromagnetic material or anything else which would impose a nonlinearity. The wave filters thus used, if provided in a sufficient number of sections, propagate the desired energy substantially without loss and are able to reject the unwanted signal frequencies to whatever extent is desired, through the use of a sufficient number of networks. A properly designed M or $\pi$ derived filter network will exclude unwanted frequencies by over one hundred decibels in just a few networks.

Lattice type filters may be employed for single frequency rejection and are extremely effective. In fact, the only serious limitation on the rejection brought about by a lattice type filter is imposed by variation in frequency of the signal which it is desired to reject. A lattice type filter, for example, may comprise two electrical capacitances and two inductive elements as the four components of a bridge. The input to the bridge and the output to the bridge have a ratio which theoretically is infinite at the frequency at which it balances. Thus it is theoretically possible to exclude a single frequency to any extent, by a single network of such a filter. At the same time a single network lattice filter can transmit very efficiently energy corresponding with signal frequencies that are substantially different from the signal frequency at which the bridge balances.

For 20 kilohertz or more, substantially perfect inductances (inductances with a Q in the realm of thousands) can be delivered in the space of a few cubic inches, and need not contain more than an ounce or two of copper wire. Again, in the frequency spectrum involving a metal box comprised of iron or copper, and with a coil spaced from the walls, inside the box, the coil neither radiates nor absorbs electromagnetic energy appreciably in this kilohertz range. Capacitances constructed of aluminum foil and wound with such a dielectric as wax paper (or mylar or polystyrene) gives a substantially perfect electrical performance in my preferred frequency range. It is, accordingly, entirely feasible to contemplate the substitution of rigorous filtering in place of the previously described geometric means of arranging radiator coils so that energy is not transferred from one system to another. Moreover, the use of well designed filters has a further advantage, that the presence of conducting bodies of any description in the doorway 6 (FIG. 1) does not cause energy to flow from one system to the other, since the wave filters function independently of whatever bodies are situated in the doorway 6 (FIG. 1). On the contrary, the geometric arrangement of coils is sensitive to the presence of electrically conducting bodies in the doorway 6 (FIG. 1) and the favorable results which is achieved by making these coils 32, 35, and 38 (FIG. 2) perpendicular are partly destroyed whenever a large electrically conducting body passes through the outgoing doorway 6 (FIG. 1).

Figure 4:
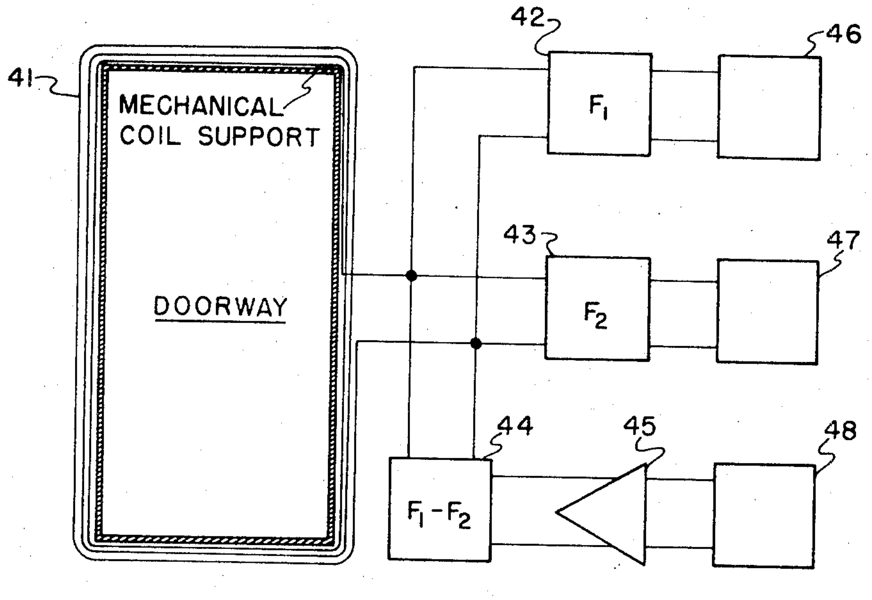
FIG. 4 is a diagram of the filter and coil system of the invention.

I turn now to FIG. 4 which illustrates the plan comprised in a general way in the foregoing discussion. In FIG. 4, for simplicity I illustrate one common radiating and receiving means 41, and one only, since this shows the flexibility of my modified plan most clearly. In the block diagram, the user will note that there are provided three distinct wave filters, each connected at its input to a separate electrical entity. The electrical entity to which the first two wave filters are connected is in each instance an oscillator. For convenience, the filters 42 and 43 are also designed by the symbol $F_1$ and $F_2$ to indicate the center of a pass band which each of the said filters 42 and 43 selectively transmits. The third filter 44 is designated by the symbol $F_1 - F_2$ to indicate the fact that the center of its pass band is chosen at the difference frequencies corresponding with the difference between the two frequencies $F_1$ and $F_2$. The filters in question are deliberately taken from designs which permit extremely strong selectivity and extremely high exclusion of the unwanted frequencies.

As an example of a frequency corresponding with a capability of extremely strong filtering, $F_1$ may be 31 kilohertz, $F_2$ may be 21 kilohertz, and $F_1 - F_2$, in fact, 10 kilohertz. These frequencies can be very stringently filtered against one another and, in fact, exclusivity can be achieved to whatever extent is required. I therefore indicate these entities as being each connected to a single electronic device in the doorway detecting and energizing system 41. A suitable doorway sensing and detecting device 41 adapted for the purpose is a flat wound coil 41 diagrammatically shown in FIG. 10. Such a flat wound coil serves effectively because the two input energy sources 46 and 47 cause a concurrent influence on the contraband at the frequencies $F_1$ and $F_2$ whenever a contraband element has a significant component of its vector $\theta$ in a direction not in the plane of the coil. In a completely reciprocal manner, the illustrated doorway coil 42 is able to receive energy at the difference tone $F_1 - F_2$ with good efficiency, and can do so whenever the contraband marker element 2 (FIG. 1) exhibits an appreciable component perpendicular to the plane of the doorway (shown in FIG. 4) (at the time the contraband element 2 [FIG. 1] is passing through the plane of the said doorway).

I refer again to FIG. 4. In this figure it will be noted that there is provided two frequency sources $F_1$ and $F_2$, and two filter systems. It is obvious that if the frequency sources which deliver energy at $F_1$ and $F_2$ are adjusted so that the frequency $F_1 = F_2$, and furthermore, if I impose the requirement that these two alternating current energy sources be in phase, then, in this degenerate case, the entire system comprising the frequency sources delivering energy at the two frequencies $F_1$ and $F_2$ has the same effect as one oscillator and one filter. Accordingly therefore I achieve the same result if I simply omit the filter $F_1$ and the oscillator 46. In a system comprised by such an omission, since $F_1 = F_2$, the quantity $F_1 - F_2$ has no significance as alternating current for the reason that $F_1 - F_2$ equals zero. However, in modulation products, as has been stated, earlier, one of the functions that is generated is $F_1 + F_2$. For the case in which $F_1 = F_2$, $F_1 + F_2$ is of course 2F.

In the modification of the system which I am now describing with the help of FIG. 4, the oscillator 46 and the filter 42 are omitted. I provide the substitution of a filter adapted to pass the frequency $2F_1$ instead of a filter 44 (as illustrated) to pass the frequency $F_1 - F_2$. The recognition of contraband marked merchandise by this modified system is identically the same as has been described in the other embodiments of my invention. From an engineering standpoint it is required that the filter 43 of FIG. 4, be adapted to particularly stringent rejection of the frequency 2F. In a lattice filter designed for single frequency rejection elimination of the unwanted frequency $2F_1$ from the output of this filter can be accomplished to more than 100 decibels in two meshes, providing the stability of the frequency of the oscillator 47 is sufficiently good. This is easily arranged by employing crystal control to stabilize the oscillator 47. I envision the use of a temperature insensitive cut of the quartz crystal and, if necessary, I employ a temperature controlled environment to further improve the frequency stability of the oscillator 47. The stability of oscillators has been controlled within one part per bilion over long periods by the careful use of these techniques. Since I do not need such extreme frequency control, the adequacy of the methods which I propose is quite obvious.

In the use of my anti-shoplifting systems there is a problem of communicating the warning signal indicating that merchandise is being stolen, and bringing the indication to the attention of security guards who are not, necessarily, at the same place. To make this procedure convenient in finished buildings where the wiring is already in place, I propose the use of ordinary carrier frequency signaling techniques that are well known in the art, and propose that the carrier frequency signals be inserted on the electric power system.

Since my warning devices are electrically powered, it is convenient to insert the carrier warning signal on the cord through which the power requirements of the system are served, making communications connections of a separate nature unnecessary. The electronic equipment necessary to put the carrier frequency warning message into the power cord will generally be a part of, or will be situated close to the other parts of the anti-shoplifting system. In fact all these things may be on the same panel rack or may be built up in the same stack of shielded boxes, as proves convenient. I visualize such carrier frequency systems as a valuable and useful feature in combination with the other elements of my invention. In FIG. 4, the carrier frequency module, is as desired, the element 48.

In FIG. 4 the operator will note that there are six electrical connections, comprising three pairs, going from the systems: (a) 46 and 42, (b) 47 and 43, and (c) 48 and 45. U.S. Pat. No. 2,520,677 (Aug. 29, 1950) makes a similar use of six wires in the form of three pairs, and provides an especially effective means for filtering out the noise from the signal frequency $F_1 \pm F_2$ ($F_1 = F_2$, is used in the discussion in this patent application). I contemplate the use of all the same means and methods for improving the signal to noise ratio in this anti-shoplifting system, and employ the same in combination with the other features of my anti-shoplifting system to better reject unwanted noise and electrical disturbances of all kinds.

I refer once more to FIG. 4, and particularly I employ the device of FIG. 4 with the omission of elements 43, 44, 45, 47 and 48. I further describe the filter $F_1$ (element 42) as a non-significant component comprised in this use of FIG. 4 device as simply a pair of wires going straight through from left to right. In effect I omit the function of this filter. In this use of the FIG. 4 device I also construe the oscillator 46 as one emitting relatively very strong electrical oscillations, and one which may at times be adjusted or at least have its frequency reset to another value as required. Further the oscillator 46 may be a "warble" oscillator adapted to cyclically retraverse a small range of frequency.

In the use which I am now describing for the FIG. 4 device, I insert the coil identified in FIG. 4 as "doorway" at the point shown for the device 4 in FIG. 1. The coil 41 is assumed to be taken to a proper scale so that it will fit in the space provided at location 4 in FIG. 1. My FIG. 4 device so arranged is, in fact, suitable to perform the deactivating function. To assure the upward radiation of a strong electromagnetic effect through the belt 2A of the checkout stand 3 shown in FIG. 1, I arrange the design of the checkout stand so that there are no closed metallic loops between the device 4 and the merchandise 1 with contraband marker 2. I further designate that the plane of my FIG. 4 coil 41 will be the same as the plane of the largest side of the box shaped space designated as numeral 4 in FIG. 1. For this use, and for all the other uses of the FIG. 4 device, it is understood that the mechanical coil support which is illustrated in FIG. 4 is an electrically non-conducting material, and a non-ferromagnetic material.

The above cited copending divisional patent application by E. R. Fearon teaches the use of a marker containing a high permeability ferromagnetic material; for example, a substance having a maximum permeability of 400,000 or thereabouts and a coercive force of 0.02 oersteds. Furthermore, he teaches selecting a very slender cross section compared with length, as for example a cross sectional area of 0.0004 square centimeters, and a length of 4 centimeters or more, the same being comprised in a ribbon not thicker than 0.00125 centimeters thick. If such a contraband marker element is presented with its axis approximately parallel to an oscillating magnetic field, the oscillating magnetic field having an intensity of the order of magnitude of three oersteads, the magnetic element so chosen returns harmonic frequencies of a very high order, extending up to and including 1.6 megacycles when excited by a frequency such as 60 cycles per second.

Figure 5:
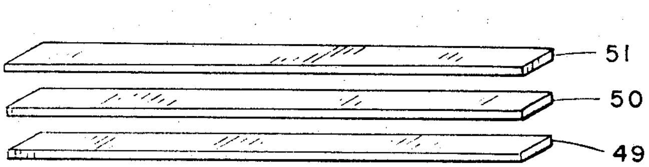
FIG. 5 illustrates the preferred claimed marker of the present invention.

The present preferred embodiment of a marker will now be described. If a contraband element generally similar to the strip disclosed by E. R. Fearon and particularly represented by element 49 of FIG. 5 is accompanied by other ferromagnetic elements also of a very slender nature, such other ferromagnetic elements being disposed close to and parallel with ferromagnetic elements which were first described, very valuable and useful results are obtained. The additional ferromagnetic elements 50 and 51 of FIG. 5 are chosen to have distinctive magnetic properties, properties not the same in the two additional ferromagnetic elements, and neither of the two additional ferromagnetic elements 50 and 51 are at all similar to the first ferromagnetic element 49. The ferromagnetic element 50 may be chosen from among those substances high in iron content which have a coercive force in the general vicinity of 15 oersteds.

The ferromagnetic element 51 may be chosen from among ferromagnetic substances high in iron which have a coercive force of approximately 100 oersteds. Other elements, not shown, may be chosen having still higher magnetic coercive force characteristics. The magnetic element 50 is of such a cross section (as for example less than 0.0004 square centimeters) that if it is left as strongly magnetized as possible, the number of lines that it will deliver is insufficient to saturate the first magnetic element 49. The cross sectional area of the ferromagnetic element 51 is so chosen that if it is left as fully magnetized as possible, and if at the same time the element 50 is also as fully magnetized as possible, and in the same direction, the lines carried by both these ferromagnetic elements are but little more than sufficient to magnetically saturate the magnetic element 49.

The ferromagnetic elements 49, 50, and 51 are shown in FIG. 5 separately, and I have illustrated nothing else, for the purpose of simplicity of the discussion. However, it will be understood that, in the use of the FIG. 5 device consisting of the combination of ferromagnetic elements shown therein, paper cards may be employed to sandwich, support, and conceal the ferromagnetic elements 49, 50, and 51 in a contraband label or marker.

The spectrum of re-radiated frequencies which results from the combination of ferromagnetic elements 49, 50 and 51 has four possibilities when the combination of adjacent ferromagnetic elements 49, 50, and 51 is carried through a doorway such as is illustrated in FIG. 1. The first possibility represents the type of reradiation that occurs when the ferromagnetic elements 50 and 51 have been degaussed and when the ambient or zero value of the magnetic field in the doorway is neutralized to have approximately no component parallel to the axis of the oscillating field components.

The second possibility occurs when the condition of the doorway is generally the same but the contraband element shown in FIG. 5 is presented in the condition in which element 50 is approximately fully magnetized but the element 51 is not magnetized. This condition is achieved by imposing a magnetic field sufficient to magnetize the element 50 but not adequate to magnetize the element 51.

A third condition of the arrangement shown in FIG. 5 exists when both the ferromagnetic elements 50 and 51 are magnetized, and are left as strongly magnetized as possible in the same direction. In this case also it is understood that the ambient condition of the doorway in FIG. 1 is the same as was previously described in connection with the spectrum condition number one referred to.

A fourth magnetic state of the arrangement shown in FIG. 5 can be obtained by arranging for the ferromagnetic elements 50 and 51 to exist in magnetized condition, but magnetized with opposite polarization. This state is achieved by first imposing a very strong magnetic field which leaves both the elements 50 and 51 magnetized in the same direction, and afterward applying a weaker field sufficient to reverse the magnetization of the element 50 (in view of its lower coercive force) but not sufficient to reverse the magnetization of the ferromagnetic element 51.

Figures 6A, 6B, 6C, 6D:
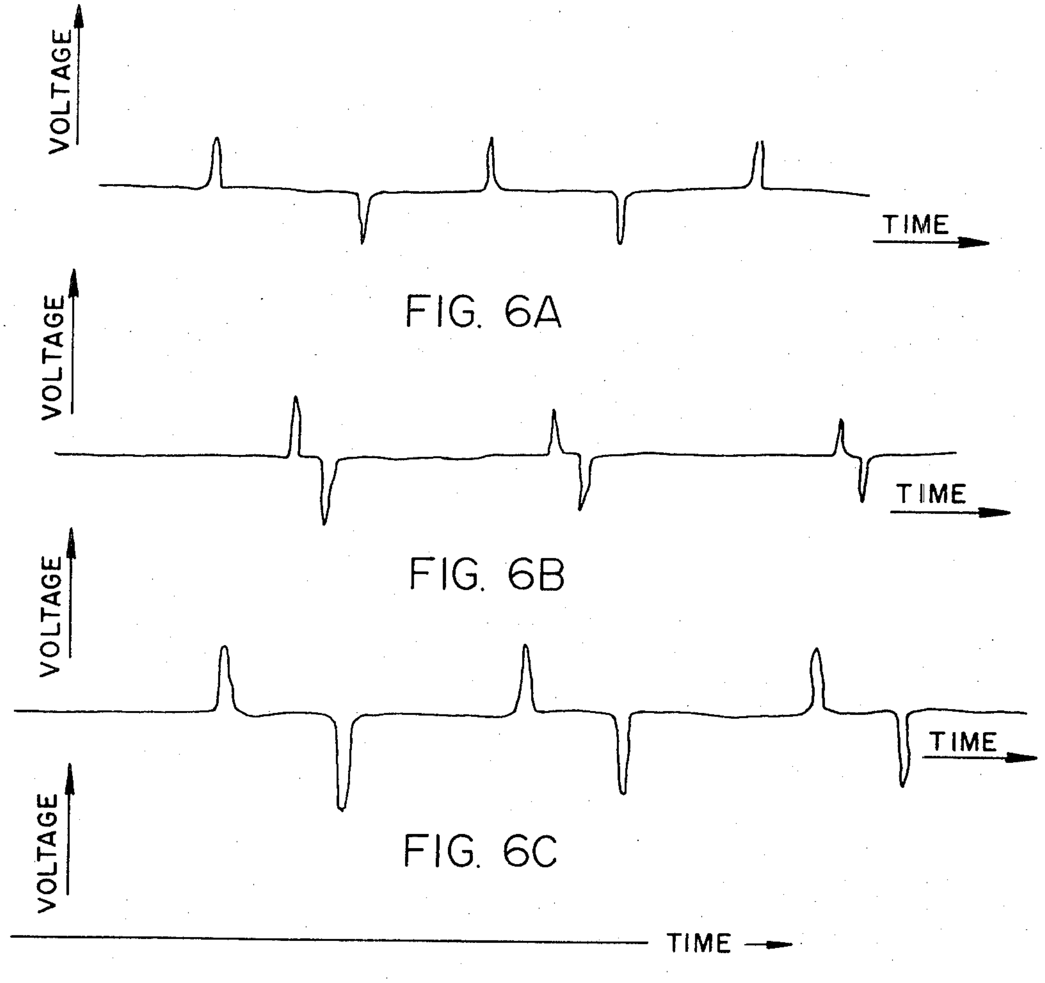
FIGS. 6A–D show typical waveforms produced as a result of different activation states of the marker of FIG. 5.

Referring now to spectrum condition number one, the expected output is shown in FIG. 6A and consists entirely of odd harmonics of the power frequency of 60 cycles. This conclusion is particularly rigorous for the case in which the loop antenna which receives the energy is chosen with a very insufficient number of turns and produces in an approximately rigorous manner an electrical voltage proportional to the time derivative of the surface integral of the magnetic flux threading through the loop antenna. The loop antenna may be element 5B of FIG. 1, for example.

Spectrum condition number two is shown in FIG. 6B and may be seen to deviate from spectrum condition number one in that even harmonics appear and represent an important contribution to the energy.

Spectrum condition number three is shown in FIG. 6D and corresponds with "silence" in the sense that the combination of elements does not radiate.

In FIG. 6C corresponding with spectrum condition four as previously described, the cusps are unevenly spaced, but the degree of unevenness is different from the unevenness shown in FIG. 6B. The distinction between the FIG. 6B information and the FIG. 6C information is that the ratio of energy delivered in even harmonics to that delivered in odd harmonics is significantly different in the two cases. Actually as the condition approaches the disappearance of the cusps, they move up until the positive and negative pulse crowd each other. As the positive pulse moves into the negative pulse, the two cancel and the information gathered by these features disappears.

Figure 7:
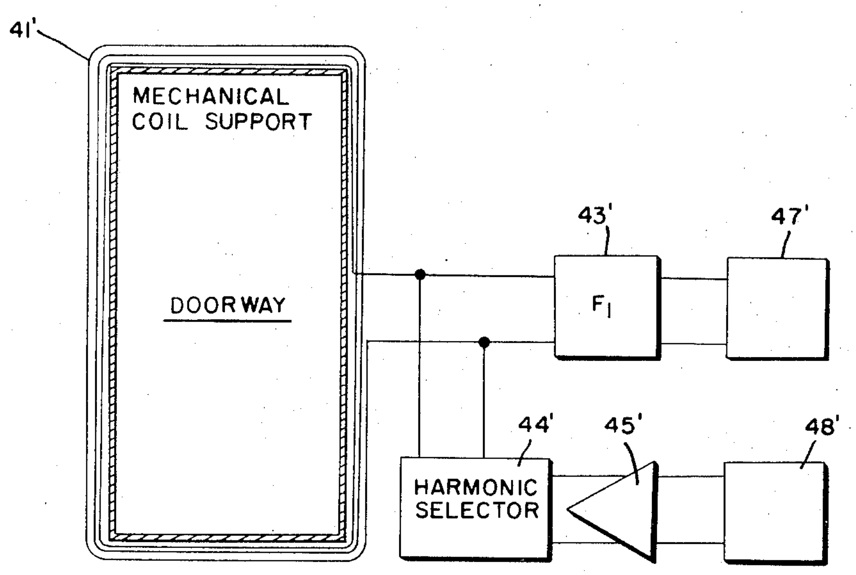
FIG. 7 illustrates the harmonic detection system of the invention.

In the use of the contraband elements of the particularly advantageous type which we have described, we employ the FIG. 7 arrangement for the electronic energizing and readout at the doorway. In this use of the previously described FIG. 4 arrangement, we omit elements 42 and 46, energizing the doorway with but a single frequency. The element 44 which has been hitherto characterized as a wave filter, we characterize instead in FIG. 7 as an electronic device for selecting even and odd harmonics present on the ingoing, leads to element 44'. The device 44' in this arrangement shown in FIG. 7 delivers a voltage proportional to the ratio of the selected even and odd harmonics on the wires going out to amplifier element 45'. In such a manner of use, the FIG. 7 device and the doorway coil 41' illustrated in connection with it, serve to energize the security readout system and communications system 48' (which relies on the output of the amplifier 45') for the purpose of energizing alarms, lighting lights, etc.

When so used, the element 44 is further qualified to indicate the condition when it receives no signal at all. Accordingly, the device 44 can deliver distinctive signals corresponding with three conditions in which energy is retransmitted from the contraband elements and finally the condition of silence when nothing is retransmitted. This number of possibilities is sufficient for codified indentification of merchandise being stolen.

Another very valuable way of using the arrangement of FIG. 5 is accomplished by omitting the ferromagnetic element 51 and choosing ferromagnetic element 50 to have a sufficient cross section that when it is fully magnetized, it is more than adequate to saturate the ferromagnetic element 49. A combination so chosen constitutes a marker that has two conditions that are clearly definable. The first signal producing condition, the unmagnetized one, corresponds with the voltage curve shown in FIG. 6A. The condition of sold merchandise, in which the marker has been commanded to be silent, is shown in FIG. 6D. This condition is brought about at the checkout stand by imposing on the marker (consisting of the elements 49 and 50, as previously set out) a magnetic field sufficiently strong to leave the element 50 in a fully magnetized condition. This modification of the marker has particular merit where it is merely desired to determine whether merchandise has been sold or not as it is carried out the doorway, and where it is not necessary to determine in codified detail what kind of merchandise is involved in a potential theft. For the more complicated problems, I prefer the previously described arrangement with at least three ferromagnetic elements, and for more complicated codes, even as many as four, all being slender and lying in reasonable close proximity to each other and essentially parallel, as shown in general in FIG. 5.

In addition to the use of the systems and apparatus disclosed herein as an anti-shoplifting means the invention may equally well be utilized in various arrangements for classification, recognition on production lines, security, and for identification of objects such as I.D. cards, cancelled tickets, and other such similar applications.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A marker for being secured to an object to enable detection of the presence, identity or status of the object within an interrogation zone having a magnetic field periodically varying at a predetermined fundamental frequency, said marker comprising:

a first elongated ferromagnetic element being dimensioned to be secured to said object, said first element having low coercivity capable of generating a detectable signal containing harmonics of said fundamental frequency when the object bearing said first element is placed in said zone, and a second ferromagnetic element disposed adjacent and generally aligned with said first element, said second element having a coercivity greater than said first element, wherein magnetization of said second element alters the harmonic content of the detectable signal produced by said first element when in said interrogation zone.

2. A marker according to claim 1 wherein said second element has a total magnetic moment capable of saturating said first ferromagnetic element to prevent said first element from generating a detectable signal.

3. A marker according to claim 1 wherein said marker further comprises:

a third ferromagnetic element having a coercivity greater than that of said second ferromagnetic element, said second and third elements being disposed adjacent to and generally aligned with said first ferromagnetic element, and said second and third ferromagnetic elements each being individually incapable of supplying a sufficient number of magnetic lines of flux to saturate said first ferromagnetic element, the magnetic lines of flux supplied by both said second and third elements when magnetized in the same direction being sufficient to saturate said first ferromagnetic element to thereby prevent said first element from generating said harmonics.

4. A marker according to claim 3 wherein said second ferromagnetic element has a coercivity of approximately 15 oersteds and said third ferromagnetic element has a coercivity of approximately 100 oersteds.

5. A marker according to claim 1 wherein said ferromagnetic elements are supported within thin insulating material.

6. A marker for being secured to an object to enable detection of the presence, identity or status of the object when the object is in an interrogation zone having a magnetic field periodically varying at a predetermined fundamental frequency, said marker comprising:

a first elongated ferromagnetic element for being secured to said object and having low coercivity capable of responding to said magnetic field when said object is placed in said interrogation zone to generate signals containing harmonics of said fundamental frequency in excess of the 20th order, and at least a second elongated ferromagnetic element disposed close to and generally aligned with said first element and having a coercivity greater than said first element, said second element when magnetized capable of altering the harmonic content of the signals produced by said first ferromagnetic element when in the interrogation zone.

7. A method of making a marker for being secured to an object to enable detection of the presence, identity or status of the object when the object is in an interrogation zone such as a doorway, said zone having a magnetic field periodically varying at a predetermined fundamental frequency, said method comprising:

selecting a first elongated ferromagnetic element of low coercivity capable of generating a detectable signal containing harmonics of said fundamental frequency when placed in said zone, selecting a second ferromagnetic element having a coercivity greater than said first element and which when magnetized alters the harmonic content of the detectable signal produced by said first element when in said interrogation zone, and disposing said first and second element adjacent to and generally aligned with one another whereby when said first and second elements are secured to an object and said object is disposed in said interrogation zone, the external magnetic field produced by magnetization in said second element acts on said first element to alter the response of said first element to said magnetic field of said zone.

8. A method of making a marker according to claim 7 and further comprising:

disposing a third ferromagnetic element having a coercivity greater than said second ferromagnetic element adjacent said first and second elements, said second and third elements each being indivudually incapable of supplying a sufficient number of lines of magnetic flux to saturate said first ferromagnetic element, the lines of magnetic flux supplied by said second and third elements when magnetized in the same direction being sufficient to saturate said first element, whereby the external magnetic field produced by magnetization in said second and third elements acts on said first element to alter the response of said first element produced when said disposed elements are subjected to said magnetic field of said zone.

9. A system for detecting a characteristic of an object when said object is in an interrogation zone having a magnetic field periodically varying at a predetermined fundamental frequency, said system comprising:

marker means for being secured to an object comprising a first elongated ferromagnetic element of low coercivity capable of generating a detectable signal containing harmonics of said fundamental frequency when placed in said zone, and at least a second ferromagnetic element disposed close to and generally aligned with said first element and having a coercivity greater than said first element, said second element when magnetized capable of altering the harmonic content of the detectable signal produced by said first element when in said interrogation zone, radiating means for producing within said interrogation zone said magnetic field, receiving means for detecting the harmonic content of the signal produced by said first element, and security readout and communication means coupled to said receiving means responsive to said signal to indicate said characteristic of an object in accordance with said harmonic content.

10. The system of claim 9 wherein said magnetic field zone has a peak intensity greater than the coercivity of said first ferromagnetic element but less than the coercivity of said second ferromagnetic element.

11. A system for detecting the characteristic of an object according to claim 9 wherein said first ferromagnetic element is further characterized by a permeability of at least 400,000, a coercivity of in the range of 0.02 oersteds, and dimensions including a ratio of the length to square root of cross-sectional area of about 200, said second ferromagnetic element being further characterized by a coercivity of about 15 oersteds, and wherein said marker further comprises a third ferromagnetic element having a coercivity greater than that of said second ferromagnetic element, said second and third elements being disposed close to and generally aligned with said first ferromagnetic element, said second and third ferromagnetic elements each being incapable of supplying by itself a sufficient number of lines of magnetic flux to saturate said first ferromagnetic element, but the lines of flux supplied by both said second and third elements being sufficient to saturate said first ferromagnetic element to thereby prevent said first element from generating said harmonics.

12. A system according to claim 9 further comprising:

means for altering the magnetization state of said marker prior to said marker being placed in said interrogation zone, such that said alteration is recognizable by the harmonic content of the signal produced upon passage of said marker through said interrogation zone.

13. A system according to claim 9 wherein said receiving means further comprises an electronic device for selecting even and odd harmonics of said fundamental frequency present in said signal and for delivering to said security readout and communication means a voltage proportional to the ratio of selected even and odd harmonics of said fundamental frequency.

14. A system for detecting a characteristic of an object comprising:

means for generating a magnetic field varying at a predetermined fundamental frequency, marker means for being attached to an object and comprising first and second elongated ferromagnetic elements having different coercivities, means for altering the magnetization state of said marker means prior to being disposed in said magnetic field, and means for detecting the harmonic content of the signal produced upon passage of said marker through said magnetic field to indicate a characteristic of said object.

15. The system of claim 14 and further comprising:

a third ferromagnetic element adjacently disposed to said first and second elements and having a higher coercivity than said first and second elements.

16. A method for detecting a characteristic of an object when the object is in an interrogation zone having a magnetic field periodically varying at a predetermined fundamental frequency, said method comprising:

securing to an object a marker comprising a first elongated ferromagnetic element of low coercivity capable of generating a detectable signal containing harmonics of said fundamental frequency when placed in said zone, and at least a second ferromagnetic element disposed adjacent to said first element and having a coercivity greater than said first element, said second element when magnetized altering the harmonic content of the detectable signal produced by said first element when in said interrogation zone;

radiating within said interrogation zone said magnetic field having a peak intensity greater than the coercivity of said first ferromagnetic element but less than the coercivity of said second ferromagnetic element;

receiving said detectable signal produced by said first element upon excitation by said varying magnetic field; and responding to said signal to produce an indication of the characteristic of an object in accordance with said harmonic content.

17. A method for detecting a characteristic of an object according to claim 16 wherein said first ferromagnetic element is further characterized by a permeability of at least 400,000 and dimensions including a high ratio of the length to square root of cross-sectional area, said second ferromagnetic element being further characterized by a coercivity of about 15 oersteds.

18. A method according to claim 16 and further comprising the step of placing said marker in a magnetizing field having a peak intensity greater than the coercivity of said second ferromagnetic material whereby said second ferromagnetic material becomes magnetized and thereby capable of altering said detectable signal produced by said first ferromagnetic element when said marker is in said interrogation zone.

* * * * *